United States Patent
Isert et al.

(10) Patent No.: US 9,889,719 B2
(45) Date of Patent: Feb. 13, 2018

(54) APPARATUS AND METHOD FOR IMPROVING AIR QUALITY IN VEHICLE

(71) Applicant: Bayerische Motoren Werke Aktiengesellschaft, Munich (DE)

(72) Inventors: Carsten Isert, Munich (DE); Peter Alfreider, Munich (DE); Biyun Zhou, Shanghai (CN)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/277,068

(22) Filed: Sep. 27, 2016

(65) Prior Publication Data

US 2017/0015177 A1 Jan. 19, 2017

Related U.S. Application Data

(63) Continuation of application No. PCT/CN2014/074243, filed on Mar. 28, 2014.

(51) Int. Cl.
*B60H 1/00* (2006.01)
*B60H 1/24* (2006.01)

(52) U.S. Cl.
CPC ......... *B60H 1/00849* (2013.01); *B60H 1/008* (2013.01); *B60H 1/00764* (2013.01);
(Continued)

(58) Field of Classification Search
CPC .. B60H 1/00849; B60H 1/24; B60H 1/00785; B60H 1/00771; B60H 1/00764; B60H 1/008
See application file for complete search history.

(56) References Cited

U.S. PATENT DOCUMENTS

| | | | | |
|---|---|---|---|---|
| 2003/0051491 A1* | 3/2003 | Kawai | ............ | B60H 1/0075 62/161 |
| 2004/0194913 A1* | 10/2004 | Umebayashi | ...... | B60H 1/00692 165/42 |
| 2008/0202139 A1* | 8/2008 | Darroman | .......... | B60H 1/00742 62/244 |

FOREIGN PATENT DOCUMENTS

| | | |
|---|---|---|
| CN | 202623852 U | 12/2012 |
| CN | 103640454 A | 3/2014 |

OTHER PUBLICATIONS

International Search Report (PCT/ISA/210) issued in PCT Application No. PCT/CN2014/874243 dated Sep. 29, 2014 (four pages).

(Continued)

*Primary Examiner* — Thomas Ingram
(74) *Attorney, Agent, or Firm* — Crowell & Moring LLP (57) ABSTRACT

An apparatus and a method for improving air quality in a vehicle are provided. The method for improving air quality in a vehicle, includes: acquiring state information about the vehicle and/or environmental information of the vehicle; determining whether ventilation of the vehicle is to be performed according to the state information and/or the environmental information; deriving a time period for ventilation of the vehicle according to the state information and/or the environmental information if it is determined that the ventilation of the vehicle is to be performed; and performing the ventilation of the vehicle in open mode automatically for the derived time period so as to improve the air quality in the vehicle. The apparatus and the method can improve the air quality in the vehicle before a user enters the vehicle, and thus provides the user with more comfort.

17 Claims, 6 Drawing Sheets

(52) U.S. Cl.
CPC ..... *B60H 1/00771* (2013.01); *B60H 1/00785* (2013.01); *B60H 1/24* (2013.01)

(56) References Cited

OTHER PUBLICATIONS

Chinese Office Action issued in counterpart Chinese Application No. 201480076796.7 dated Jun. 9, 2017 with English-language translation (nineteen (19) pages).

* cited by examiner

APPARATUS AND METHOD FOR IMPROVING AIR QUALITY IN VEHICLE

CROSS REFERENCE TO RELATED APPLICATIONS

This application is a continuation of PCT International Application No. PCT/CN2014/074243, filed Mar. 28, 2014, the entire disclosure of which is herein expressly incorporated by reference.

BACKGROUND AND SUMMARY OF THE INVENTION

The present invention relates in general to the field of management of air quality in a vehicle, and more particularly, to an apparatus and associated method for improving the air quality in the vehicle.

The air quality in the vehicle concerns the health of a driver and/or passengers in the vehicle. Therefore, it is necessary to manage the air quality in the vehicle. In general, the exchange of the air happens quite fast. As a result, if the windows and/or doors of the vehicle are opened, the air quality inside the vehicle will rapidly change to the same air quality outside the vehicle.

In recent years, various solutions to manage the air quality in the vehicle have already been proposed. For example, an Automatic Air Recirculation (AAR) system is provided to protect the driver and/or passengers in the vehicle by preventing pollutants outside the vehicle from entering the vehicle. Specifically, the AAR system can obtain the information about concentrations of the gas outside the vehicle, e.g., carbon monoxide, nitrogen oxide and so on. If the obtained information indicates that the concentrations of the gas outside the vehicle are too high, the AAR system automatically switches to internal circulation for a time (closed mode). If the obtained information indicates that the concentrations of the gas outside the vehicle have decreased, the AAR system reintroduces the air into the vehicle from outside thereof (open mode).

Furthermore, in the modified AAR system, the air in the vehicle can be filtered by the existing vehicle filters in the closed mode as mentioned above. This can result in the further improved air quality when the AAR system runs in the closed mode.

In addition, the user may have the options to perform stand still climatization or heating by either programming it and setting the time manually in the head unit, or by using a remote control, or by using an Internet service.

Moreover, there is also a submission about the use of the Internet-based air quality measurements in the vehicle.

However, in the prior art, the management of the air quality (including the management of air temperature) in the vehicle is mainly performed after the driver and/or passengers enter the vehicle. This means that, in extreme conditions such as hot, cold, severely polluted conditions and so on, the first period of the driver and/or passengers in the vehicle is not an enjoyable experience because the smell, bad air quality and extreme temperature generate discomfort.

Furthermore, the method currently available to precondition the vehicle for the user always requires manual interaction of the user with the vehicle, and the user has to think about the manual interaction with the vehicle before entering the vehicle. As a result, the functions of preconditioning the vehicle are not used by the user very frequently, and the user may be confronted with bad air quality inside the vehicle when he/she arrives at the vehicle.

Moreover, the interior of the vehicle also produces pollutants such as formaldehyde from decorative materials, adhesive, seat cushions and so on. In particular, for a new vehicle, the interior thereof suffers uncomfortable odors.

However, no gas sensors are currently installed inside the vehicle. Thus, the AAR system in the prior art cannot detect the pollutants emitted by the interior of the vehicle, and thus cannot improve the internal air quality of the vehicle.

In addition, it is currently not possible to completely get air out of the vehicle because there is only a small hole in the truck of the vehicle for pressure exchange.

An aspect of the present invention is to provide an apparatus and a method for improving the air quality in the vehicle that can address one or more of the above and other prior art problems.

In accordance with an exemplary embodiment of the present invention, a method for improving air quality in a vehicle is provided, comprising: acquiring state information about the vehicle and/or environmental information of the vehicle; determining whether ventilation of the vehicle is to be performed according to the state information and/or the environmental information; deriving a time period for ventilation of the vehicle according to the state information and/or the environmental information if it is determined that the ventilation of the vehicle is to be performed; and performing the ventilation of the vehicle in open mode automatically for the derived time period so as to improve the air quality in the vehicle In an example of the present embodiment, the state information about the vehicle may be an age of the vehicle.

In another example of the present embodiment, the step of determining comprises: determining the ventilation of the vehicle is to be performed if the age of the vehicle is within a predetermined range of ages.

In another example of the present embodiment, the step of deriving comprises: when the age of the vehicle is within the predetermined range of ages, the smaller the age of the vehicle is, the longer the time period for ventilation of the vehicle is.

In another example of the present embodiment, the state information about the vehicle may be an unused time that the vehicle is not used.

In another example of the present embodiment, the step of determining comprises: determining that ventilation of the vehicle is to be performed if the unused time exceeds a predetermined interval.

In another example of the present embodiment, the step of deriving comprises: when the unused time exceeds the predetermined interval, the longer the unused time is, the longer the time period for ventilation of the vehicle is.

In another example of the present embodiment, the environmental information may be prediction information regarding usage of the vehicle.

In another example of the present embodiment, the step of determining comprises: determining, with the prediction information, the time point at which the vehicle will be used; and determining that ventilation of the vehicle is to be performed a predetermined time length before the time point at which the vehicle will be used.

In another example of the present embodiment, the environmental information may be temperature and/or humidity of air.

In another example of the present embodiment, the step of determining comprises: determining that ventilation of the vehicle is to be performed if the temperature and/or the humidity is higher than a predetermined value.

In another example of the present embodiment, the step of deriving comprises: when the temperature and/or humidity is higher than the predetermined value, the longer the vehicle is exposed outdoor, the longer the time period for ventilation of the vehicle is.

In accordance with another exemplary embodiment of the present invention, an apparatus of improving air quality in a vehicle is provided, comprising: an acquiring unit for acquiring state information about the vehicle and/or environmental information of the vehicle; a determining unit for determining whether ventilation of the vehicle is to be performed according to the state information and/or the environmental information; a deriving unit for deriving a time period for ventilation of the vehicle according to the state information and/or the environmental information if it is determined that the ventilation of the vehicle is to be performed; and a performing unit for performing the ventilation of the vehicle in open mode automatically for the derived time period so as to improve the air quality in the vehicle.

In an example of the present embodiment, the state information about the vehicle may be an age of the vehicle.

In another example of the present embodiment, the determining unit is further configured to: determine that ventilation of the vehicle is to be performed if the age of the vehicle is within a predetermined range of ages.

In another example of the present embodiment, the deriving unit is further configured that: when the age of vehicle is within the predetermined range of ages, the smaller the age of the vehicle is, the longer the time period for ventilation of the vehicle is.

In another example of the present embodiment, the state information about the vehicle may be an unused time that the vehicle is not used.

In another example of the present embodiment, the determining unit is further configured to: determine that ventilation of the vehicle is to be performed if the unused time exceeds a predetermined interval.

In another example of the present embodiment, the deriving unit is further configured that: when the unused time exceeds the predetermined interval, the longer the unused time is, the longer the time period for ventilation of the vehicle is.

In another example of the present embodiment, the environmental information may be prediction information regarding usage of the vehicle.

In another example of the present embodiment, the determining unit is further configured to: determine, with the prediction information, the time point at which the vehicle will be used; and determine that the ventilation of the vehicle is to be performed a predetermined time length before the time point at which the vehicle will be used.

In another example of the present embodiment, the environmental information may be temperature and/or humidity of air.

In another example of the present embodiment, the determining unit is further configured to: determine that ventilation of the vehicle is to be performed if the temperature and/or the humidity is higher than a predetermined value.

In another example of the present embodiment, the deriving unit is further configured that: when the temperature and/or humidity is higher than the predetermined value, the longer the vehicle is exposed outdoors, the longer the time period for ventilation of the vehicle is.

In accordance with another exemplary embodiment of the present invention, there is provided a computer readable medium comprising executable instructions for carrying out a method for improving air quality in a vehicle according to any one of the previous embodiments.

The present invention can improve the air quality in the vehicle by utilizing the state information about the vehicle and/or environmental information of the vehicle before the user enters the vehicle, and thus provides the user with more comfort.

Other objects, advantages and novel features of the present invention will become apparent from the following detailed description of one or more preferred embodiments when considered in conjunction with the accompanying drawings.

BRIEF DESCRIPTION OF THE DRAWINGS

The above and other aspects and advantages of the present invention will become apparent from the following detailed description of exemplary embodiments taken in conjunction with the accompanying drawings which illustrate, by way of example, the principles of the invention.

DETAILED DESCRIPTION OF THE DRAWINGS

In the following detailed description, numerous specific details are set forth to provide a thorough understanding of the described exemplary embodiments. It will be apparent, however, to one skilled in the art that the described embodiments can be practiced without some or all of these specific details. In other exemplary embodiments, well known structures or process steps have not been described in detail in order to avoid unnecessarily obscuring the concept of the present invention.

Figure 1:
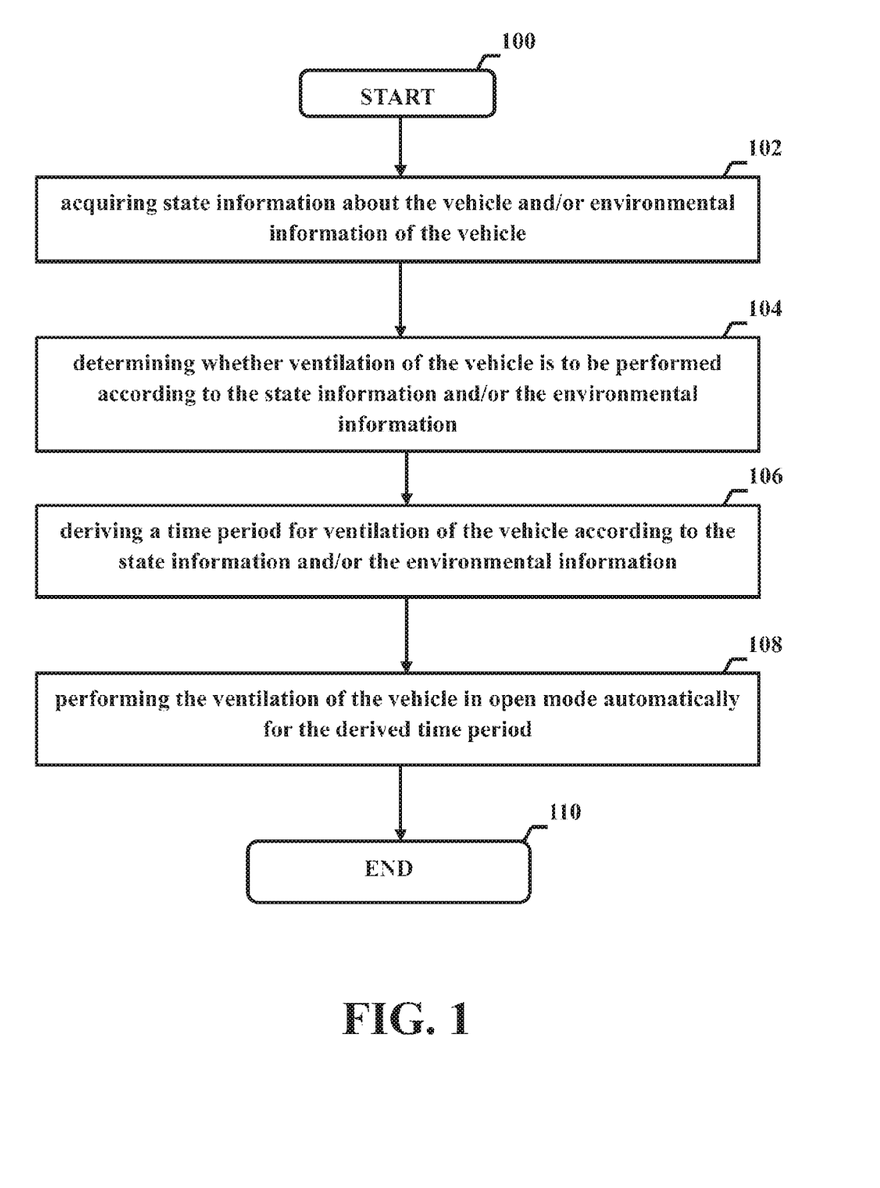
FIG. 1 illustrates a flow chart showing a method for improving air quality in a vehicle in accordance with an exemplary embodiment of the present invention.

Referring first to FIG. 1, there is shown a flow chart of a method for improving air quality in a vehicle in accordance with an exemplary embodiment of the present invention. The method starts at step 100. After step 100, the method proceeds to step 102.

At step 102, the state information about the vehicle and/or environmental information of the vehicle are acquired. According to one embodiment of the present invention, the state information about the vehicle may be an age of the vehicle. According to another embodiment of the present invention, the state information about the vehicle may be an unused time that the vehicle is not used. According to yet another embodiment of the present invention, the environmental information may be prediction information regarding usage of the vehicle. According to still another embodiment of the present invention, the environmental information may be temperature and/or humidity of air. The above-mentioned state information and environmental information are only examples. Those skilled in the art would appreciate other suitable state information and environmental information according to the teaching of the present invention.

There are various sources from which the state information and/or the environmental information may be acquired. For example, the state information and/or the environmental information may be acquired from a sensor or from a backend, etc. It is preferable to acquire the state information and/or the environmental information from the backend as it does not result in an increased cost. Hereinafter, the present invention will be described in detail in combination with the specific state information and/or environmental information.

After step 102, the method proceeds to step 104. At step 104, it is determined whether ventilation of the vehicle is to be performed according to the state information and/or the environmental information. In general, the air quality in the vehicle may be substantially determined according to the acquired state information and/or environmental information, and the ventilation of the vehicle may be based on the air quality in the vehicle. For example, if the air quality in the vehicle is bad or may hurt the health of the user, it is necessary to perform the ventilation of the vehicle. Therefore, it is possible to determine whether ventilation of the vehicle is to be performed according to the state information and/or the environmental information. Moreover, in order to make the determination of the ventilation of the vehicle more effective, it is preferable to further consider some other factors such as battery condition, vehicle status, temperature range or driving time, etc. However, those skilled in the art would appreciate that the other factors mentioned above may not be necessarily considered.

After step 104, the method proceeds to step 106. At step 106, a time period for ventilation of the vehicle is derived according to the state information and/or the environmental information if it is determined that the ventilation of the vehicle is to be performed. If it is determined in step 104 that the ventilation of the vehicle is to be performed, a time period for the ventilation of the vehicle may be derived according to the state information and/or the environmental information. In general, a degree of the air quality in the vehicle may be substantially determined according to the acquired state information and/or environmental information, and a time period for the ventilation of the vehicle may be based on the degree of the air quality in the vehicle. For example, the higher the degree of air quality in the vehicle is, the longer the time period for the ventilation of the vehicle is needed. Therefore, it is possible to derive a time period for ventilation of the vehicle according to the state information and/or the environmental information. Moreover, in order to make the derivation of the time period of the ventilation of the vehicle more accurate, it is preferable to further consider some other factors such as temperature, etc. However, those skilled in the art would appreciate that the other factors as mentioned above may not be necessarily considered.

After step 106, the method proceeds to step 108. At step 108, the ventilation of the vehicle in open mode is performed automatically for the derived time period so as to improve the air quality in the vehicle. When the time period for the ventilation of the vehicle is derived in step 106, for example, an actuator is controlled to automatically perform the ventilation in open mode for the derived time period. This will improve the air quality in the vehicle as the pollutants will be transported to the outside of the vehicle through trunk openings or other openings in the vehicle.

Finally, the method ends at step 110. In general, the ventilation of the vehicle will stop at the end of the time period as mentioned above. Moreover, some other factors such as battery condition, temperature, or vehicle status, etc. may also result in the stoppage of the ventilation of the vehicle. However, those skilled in the art would appreciate that the other factors as mentioned above may not be necessarily considered.

According to an embodiment of the present invention, the air quality in the vehicle can be improved by utilizing the state information about the vehicle and/or environmental information of the vehicle before the user enters the vehicle, and thus the user can be more comfortable when entering the vehicle.

Figure 2:
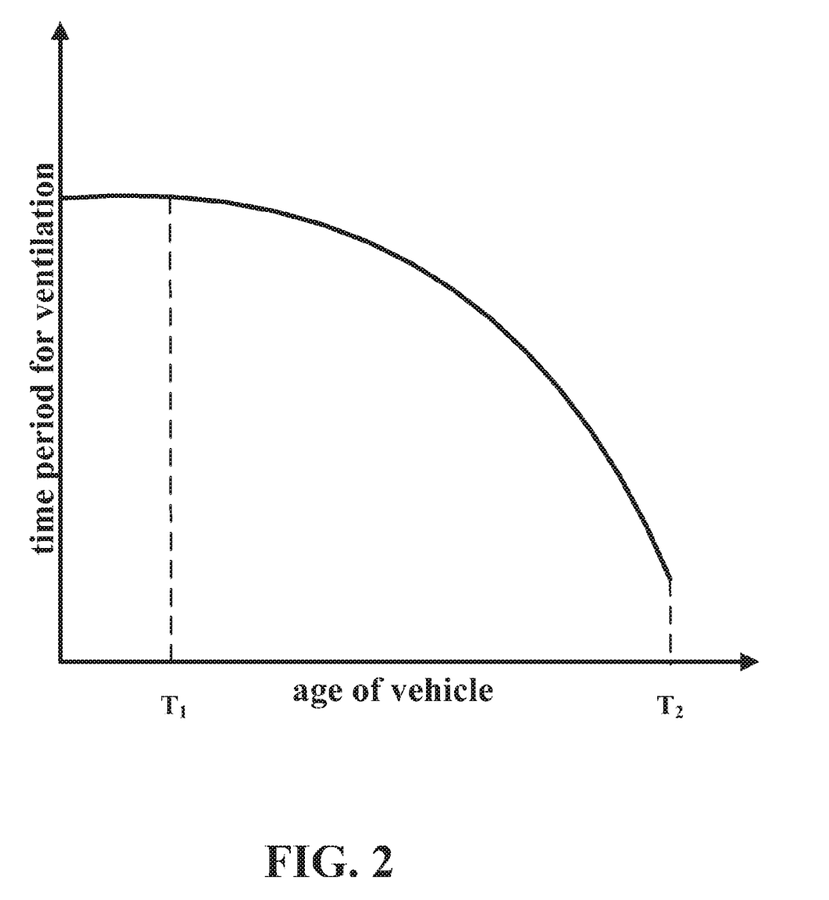
FIG. 2 illustrates a relationship between the time period for ventilation of the vehicle and the age of a vehicle in accordance with an exemplary embodiment of the present invention.
Figure 3:
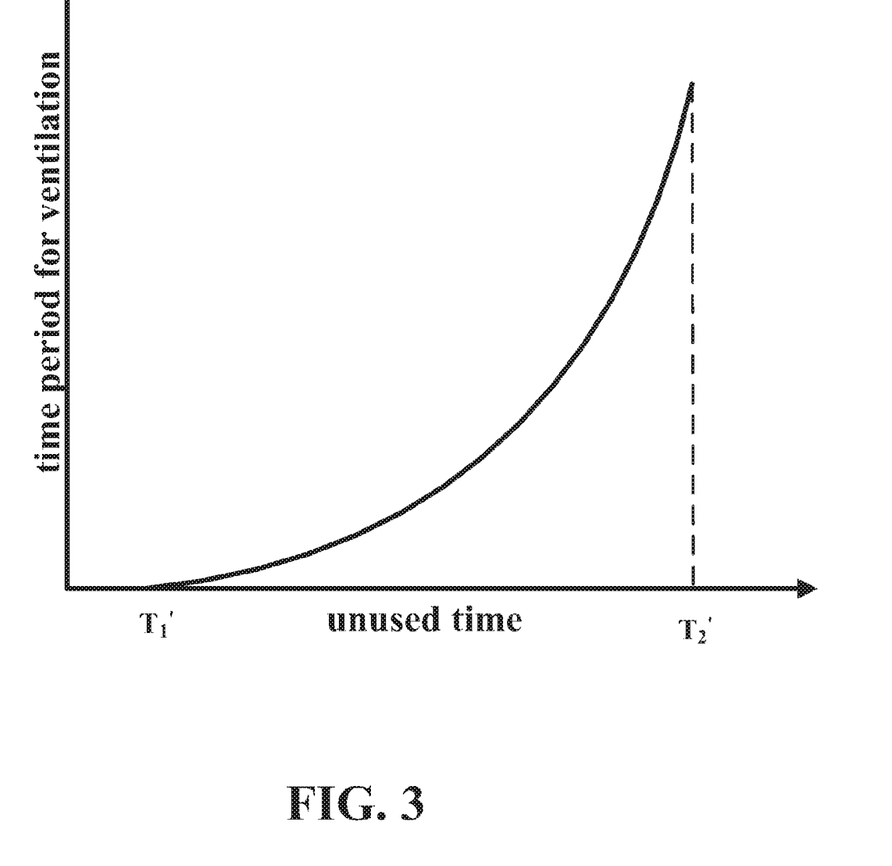
FIG. 3 illustrates a relationship between the time period for ventilation of the vehicle and the unused time of a vehicle in accordance with an exemplary embodiment of the present invention.
Figure 4:
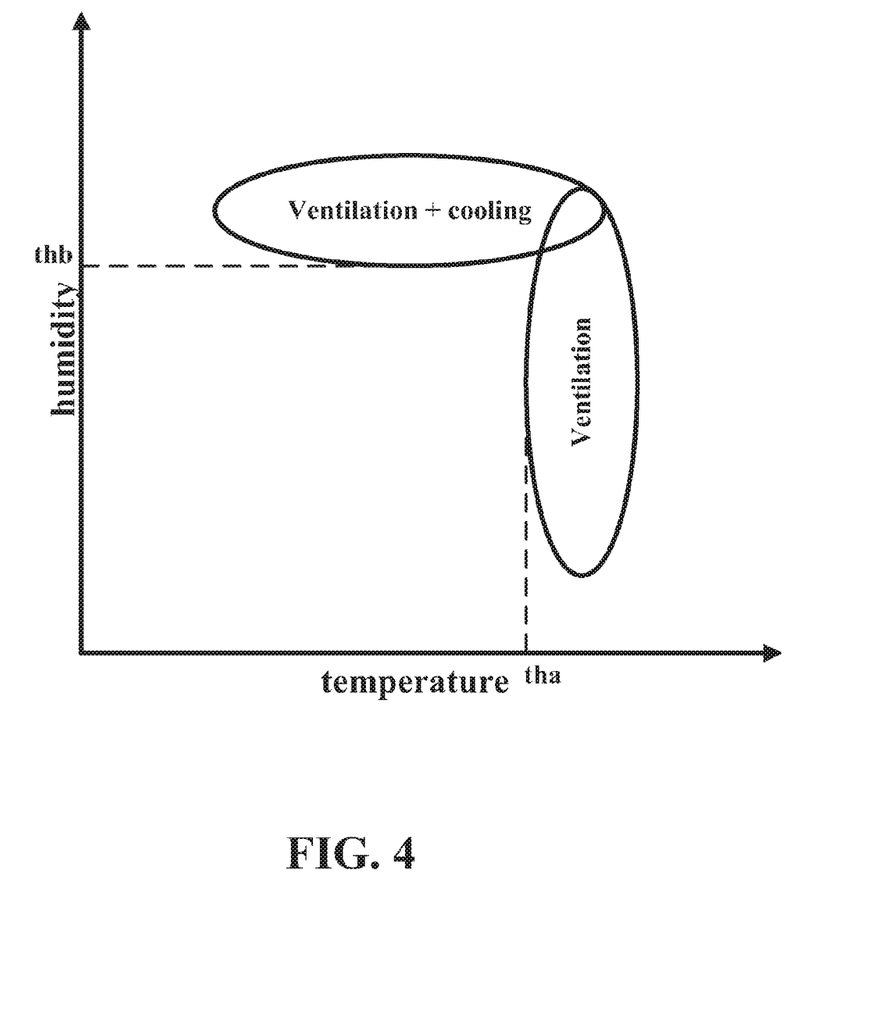
FIG. 4 illustrates a relationship between the ventilation of the vehicle and the temperature and/or humidity of the air in accordance with an exemplary embodiment of the present invention.

Hereinafter, the method according to the present invention will be described with many specific details in combination with FIGS. 2-4. Again, such specific details are given by way of example, and the present invention may be practiced without some or all of the details.

Embodiment 1

As stated above, the state information about the vehicle may be an age of the vehicle. Hereinafter, the first embodiment of the method according to the present invention will be described by using the age of the vehicle in combination with FIG. 2. FIG. 2 illustrates a relationship between the time period for ventilation of the vehicle and the age of a vehicle in accordance with an exemplary embodiment of the present invention.

Firstly, an age of the vehicle can be acquired. For example, the age of the vehicle may be in units of months or years. The information about the age of the vehicle can be acquired from, for example, a backend such as a vehicle history information database.

Then, it is determined whether ventilation of the vehicle is to be performed according to the acquired age of the vehicle. According to an embodiment of the present invention, it is determined to perform the ventilation of the vehicle if the age of the vehicle is within a predetermined range of ages. As illustrated in FIG. 2, if the age of the vehicle is below the age threshold $T_2$, that is, if the age of the vehicle is within a predetermined range of ages from 0 to $T_2$, it is determined to perform the ventilation of the vehicle. Moreover, as stated above, in order to make the determination of the ventilation of the vehicle more effective, it is preferable to further consider some other factors such as battery condition, vehicle status, temperature range or driving time, etc. Specifically, in order to start the ventilation of the vehicle, for example, the battery should be in good condition. For example, the State Of Charge (SOC) of the battery should be greater than a predefined level such as 90%. Furthermore, in order to determine whether to start the ventilation of the vehicle or not, for example, the driving time of the vehicle can be considered. For example, when the vehicle has been driven for a long time, there is no real need to perform extra ventilation. However, when the driving time is short, the extra ventilation can provide additional opportunity to remove smells. Furthermore, in order to determine whether to start the ventilation of the vehicle or not, for example, the status of the vehicle can be considered. For example, if the status of the vehicle is at an end of the vehicle movement, it may be determined to perform the ventilation of the vehicle. Moreover, in order to determine whether to start the ventilation of the vehicle or not, for example, a temperature range can be specified. For example, the higher the temperature is, the higher the possibility of performing the ventilation of the vehicle is. However, when it is at the end of the vehicle movement, the temperature inside the vehicle will usually be a comfortable temperature. Generally, there is no need to check the air quality outside of the vehicle as the doors and/or the windows of the vehicle are opened and the air exchange is very quick. However, as stated above, those skilled in the art would appreciate that the other factors as mentioned above may not be necessarily considered.

Subsequently, a time period for ventilation of the vehicle is derived according to the age of the vehicle if it is determined that the ventilation of the vehicle is to be performed. According to an embodiment of the present invention, when the age of vehicle is within the predetermined range of ages, the smaller the age of the vehicle is, the longer the time period for ventilation of the vehicle is. As illustrated in FIG. 2, if the age of the vehicle is below the age threshold $T_1$, such as 6 months, the time period for the ventilation of the vehicle should be as long as possible, but should also consider the condition of the vehicle battery and not activate ventilation if the condition of the battery is below a certain level. Furthermore, as illustrated in FIG. 2, if the age of the vehicle is between the age threshold $T_1$ and the age threshold $T_2$, the time period for the ventilation of the vehicle decreases as the age of the vehicle increases.

Next, the ventilation of the vehicle in open mode is performed automatically for the derived time period so as to improve the air quality in the vehicle. As stated above, the ventilation of the vehicle will generally stop at the end of the time period for the ventilation of the vehicle. Moreover, some other factors such as battery condition, temperature, or vehicle status, etc. may also result in the stopping of the ventilation of the vehicle. Specifically, for example, when the condition of the vehicle battery falls below a certain level, or when the temperature is too low, or when the status of the vehicle is at the start of the vehicle movement, the ventilation of the vehicle may stop. Generally, there is no need to check the air quality outside of the vehicle as the doors and/or the windows of the vehicle are opened and the air exchange is very quick. However, those skilled in the art would appreciate that the other factors as mentioned above may not be necessarily considered.

According to the embodiment of the present invention, the air quality in the vehicle can be improved by utilizing the information about the age of the vehicle before the user enters the vehicle, and thus the user can be more comfortable when entering the vehicle.

Embodiment 2

As stated above, the state information about the vehicle may be an unused time that the vehicle is not used. Hereinafter, the second embodiment of the method according to the present invention will be described by using the unused time of the vehicle in combination with FIG. 3. FIG. 3 illustrates a relationship between the time period for ventilation of the vehicle and the unused time of a vehicle in accordance with an exemplary embodiment of the present invention.

Firstly, an unused time that the vehicle is not used can be acquired. For example, the unused time of the vehicle may be in units of days. The information about the unused time of the vehicle can be acquired from, for example, a backend such as a vehicle history information database, or from sensors for detecting the unused time of the vehicle.

Then, it is determined whether ventilation of the vehicle is to be performed according to the acquired unused time of the vehicle. According to an embodiment of the present invention, it is determined to perform the ventilation of the vehicle if the unused time of the vehicle exceeds a predetermined interval. As illustrated in FIG. 3, if the unused time of the vehicle exceeds a predetermined interval $T_1'$, it is determined to perform the ventilation of the vehicle. For example, the predetermined interval $T_1'$ may be several hours such as 3 to 5 hours. Moreover, as stated above, in order to make the determination of the ventilation of the vehicle more effective, it is preferable to further consider some other factors such as battery condition, vehicle status or temperature range, etc. Specifically, in order to start the ventilation of the vehicle, for example, the battery should be in good condition. For example, the State Of Charge (SOC) of the battery should be greater than a predefined level such as 90%. Furthermore, in order to determine whether to start the ventilation of the vehicle or not, for example, the status of the vehicle can be considered. For example, if the status of the vehicle is standstill, it may be determined to perform the ventilation of the vehicle. Moreover, the length of the predetermined interval $T_1'$ can also depend on the temperature. For example, the higher the temperature is, the shorter the predetermined interval $T_1'$ is, and thus the ventilation of the vehicle will be performed more frequently for higher temperatures. Generally, there is no need to check the air quality outside of the vehicle as the doors and/or the windows of the vehicle are opened and the air exchange is very quick. However, as stated above, those skilled in the art would appreciate that the other factors as mentioned above may not be necessarily considered.

Subsequently, a time period for ventilation of the vehicle is derived according to the unused time of the vehicle if it is determined that the ventilation of the vehicle is to be performed. According to an embodiment of the present invention, when the unused time of the vehicle exceeds the predetermined interval, the longer the unused time of the vehicle is, the longer the time period for ventilation of the vehicle is. As illustrated in FIG. 3, if the unused time of the vehicle is between the predetermined interval $T_1'$ and the predetermined interval threshold $T_2'$, the time period for the ventilation of the vehicle increases as the unused time of the vehicle increases, but should also consider the condition of the vehicle battery and not activate if the condition of the battery is below a certain level. Moreover, the time period for ventilation of the vehicle can also depend on the temperature. For example, the higher the temperature is, the longer the time period for ventilation of the vehicle is, and thus the ventilation of the vehicle will be performed longer for higher temperatures.

Next, the ventilation of the vehicle in open mode is performed automatically for the derived time period so as to improve the air quality in the vehicle. As stated above, the ventilation of the vehicle will generally stop at the end of the time period for the ventilation of the vehicle. Moreover, some other factors such as battery condition, temperature, or vehicle status, etc. may also result in the stopping of the ventilation of the vehicle. Specifically, for example, when the condition of the vehicle battery falls below a certain level, or when the temperature is too low, or when the status of the vehicle is at the start of the vehicle movement, the ventilation of the vehicle may stop. Generally, there is no need to check the air quality outside of the vehicle as the doors and/or the windows of the vehicle are opened and the air exchange is very quick. However, those skilled in the art would appreciate that the other factors as mentioned above may be not necessarily considered.

According to the embodiment of the present invention, the air quality in the vehicle can be improved by utilizing the information about the unused time of the vehicle before the user enters the vehicle, and thus the user can be more comfortable when entering the vehicle.

Embodiment 3

As stated above, the environmental information may be prediction information regarding usage of the vehicle. Hereinafter, the third embodiment of the method according to the present invention will be described by using the prediction information regarding usage of the vehicle.

Firstly, the prediction information regarding usage of the vehicle can be acquired. The prediction information regarding usage of the vehicle can be acquired from, for example, a backend based prediction system. In general, the output of the prediction system may include, for example, the start time, the destination and a probability. The calendar information of the user can be integrated into the prediction system. There can be a simple version of the prediction system which runs mainly on the calendar data from the user. There could be different types of implementation. For example, the very easy implementation would be as follows: the user could enter special keywords in the calendar which indicate the usage of the vehicle, or the prediction system could automatically derive the prediction information regarding usage of the vehicle from the mobility patterns and/or the historical vehicle usage.

Then, it is determined whether ventilation of the vehicle is to be performed according to the prediction information regarding usage of the vehicle. According to an embodiment of the present invention, the time point at which the vehicle will be used is determined with the prediction information, and it is determined to perform the ventilation of the vehicle a predetermined time length before the time point at which the vehicle will be used. For example, if it is determined with the prediction information that the user will use the vehicle at 10:00 AM, the ventilation of the vehicle will be performed a predetermined time length before 10:00 AM, for example, approximately 30 minutes before 10:00 AM, that is, the ventilation of the vehicle will be performed at 9:30 AM. Moreover, odorization can be also turned on shortly before the user enters the vehicle to generate a nice smell that can reduce the percentage of the new vehicle smell. Several other actions can also be performed in terms of climatization. For example, the seat or steering wheel climatization functions (heating/cooling) can also be activated shortly before the user enters the vehicle so that the temperature inside the vehicle is comfortable when the user probably enters the vehicle. The comfortable in-vehicle atmosphere can even be customized according to the "climate type" which the driver selects, and can be achieved through the cooperation with air conditioning, seat heating, seat ventilation, fragrance, lights and sounds. Even if there is no stand still climatization, the ventilation of the vehicle before driving the vehicle can already significantly improve the air quality and the temperature inside the vehicle, especially if the vehicle is standing under the sun on a hot day.

Subsequently, a time period for ventilation of the vehicle is derived according to the prediction information regarding usage of the vehicle if it is determined that the ventilation of the vehicle is to be performed. For example, if it is determined with the prediction information that the user will use the vehicle at 10:00 AM, the ventilation of the vehicle will be performed for a predetermined time length before 10:00 AM, for example, approximately 30 minutes before 10:00 AM, that is, the ventilation of the vehicle will be performed from 9:30 AM to 10:00 AM.

Next, the ventilation of the vehicle in open mode is performed automatically for the derived time period so as to improve the air quality in the vehicle. Furthermore, a general problem when using the prediction system in combination with climatic preconditioning is that the heat exchange of air happens quite fast, but it takes quite a while to cool down a vehicle. Typically, it could take about 10 minutes to cool down the vehicle, but if the cooling is stopped, the temperature rises again very quickly. Moreover, in combination with the inaccuracy of the prediction system, it can lead to a bad customer experience as the vehicle can be too hot or cold although the prediction system is used. The general accuracy of the prediction does not meet the actual requirements. This problem may be solved by generating an interaction process with the user which is easy to be managed. Specifically, the vehicle or the backend based prediction system can generate a reminder by using the predictions and current weather conditions etc. and push the reminder to the user so that the user can accept this request and adjust the timing according to the current situation. This can be implemented by an APP, e-mail, SMS, browser interface, vehicle key, etc.

As stated above, the ventilation of the vehicle will generally stop at the end of the time period for the ventilation of the vehicle. Moreover, some other factors such as battery condition, temperature, or vehicle status, etc. may also result in the stop of the ventilation of the vehicle. Specifically, for example, when the condition of the vehicle battery falls below a certain level, or when the temperature is too low, or when the status of the vehicle is at the start of the vehicle movement, the ventilation of the vehicle may stop. Generally, there is no need to check the air quality outside of the vehicle as the doors and/or the windows of the vehicle are opened and the air exchange is very quick. However, those skilled in the art would appreciate that the other factors as mentioned above may not be necessarily considered.

According to the embodiment of the present invention, the air quality in the vehicle can be improved by utilizing the prediction information regarding usage of the vehicle before the user enters the vehicle, and thus the user can be more comfortable when entering the vehicle.

Embodiment 4

As stated above, the environmental information may be temperature and/or humidity of air. Hereinafter, the fourth embodiment of the method according to the present invention will be described by using the temperature and/or humidity of air in combination of FIG. 4. FIG. 4 illustrates a relationship between the ventilation of the vehicle and the temperature and/or humidity of the air in accordance with an exemplary embodiment of the present invention.

Firstly, a temperature and/or humidity of air can be acquired. The information about the temperature and/or humidity of air can be acquired from, for example, the weather forecast.

Then, it is determined whether ventilation of the vehicle is to be performed according to the acquired temperature and/or humidity of air. According to an embodiment of the present invention, it is determined to perform the ventilation of the vehicle if the temperature and/or the humidity is higher than a predetermined value. As illustrated in FIG. 4, if the temperature of the air exceeds a predetermined threshold tha or the humidity of the air exceeds a predetermined threshold thb, it is determined to perform the ventilation of the vehicle. Furthermore, if the temperature of the air exceeds a predetermined threshold tha and the humidity of the air exceeds a predetermined threshold thb, it is determined to perform the ventilation of the vehicle as well as the cooling of the vehicle because there is a chance of mold or bacteria growth in the ventilation system in this case. Moreover, as stated above, in order to make the determination of the ventilation of the vehicle more effective, it is preferable to further consider some other factors such as battery condition or vehicle status, etc. Specifically, in order to start the ventilation of the vehicle, for example, the battery should be in good condition. For example, the State Of Charge (SOC) of the battery should be greater than a predefined level such as 90%. Furthermore, in order to determine whether to start the ventilation of the vehicle or not, for example, the status of the vehicle can be considered. For example, if the status of the vehicle is at the end of the vehicle movement, it may be determined to perform the ventilation of the vehicle. However, as stated above, those skilled in the art would appreciate that the other factors as mentioned above may not be necessarily considered.

Subsequently, a time period for ventilation of the vehicle is derived according to the temperature and/or humidity of air if it is determined that the ventilation of the vehicle is to be performed. According to an embodiment of the present invention, when the temperature and/or humidity is higher than the predetermined value, the longer the vehicle is exposed outdoor, the longer the time period for ventilation of the vehicle is. In general, the longer the vehicle is exposed outdoor, the higher the temperature and/or humidity of air is, and thus the longer the time period for ventilation of the vehicle is.

Next, the ventilation of the vehicle in open mode is performed automatically for the derived time period so as to improve the air quality in the vehicle. As stated above, the ventilation of the vehicle will generally stop at the end of the time period for the ventilation of the vehicle. Moreover, some other factors such as battery condition, temperature, or vehicle status, etc. may also result in the stop of the ventilation of the vehicle. Specifically, for example, when the condition of the vehicle battery falls below a certain level, or when the temperature is too low, or when the status of the vehicle is at the start of the vehicle movement, the ventilation of the vehicle may stop. However, those skilled in the art would appreciate that the other factors as mentioned above may not be necessarily considered.

According to the embodiment of the present invention, the air quality in the vehicle can be improved by utilizing the information about the temperature and/or humidity of air before the user enters the vehicle, and thus the user can be more comfortable when entering the vehicle.

Although the above embodiments 1 to 4 are separately discussed with different state information and environmental information, some or all of the above different state information and environmental information can also be combined or integrated together to perform the ventilation of the vehicle more effectively. For example, the information about the age of the vehicle can be combined with the information about the unused time of the vehicle to perform the ventilation of the vehicle more effectively. The other combinations of embodiments 1 to 4 are also possible.

Figure 5:
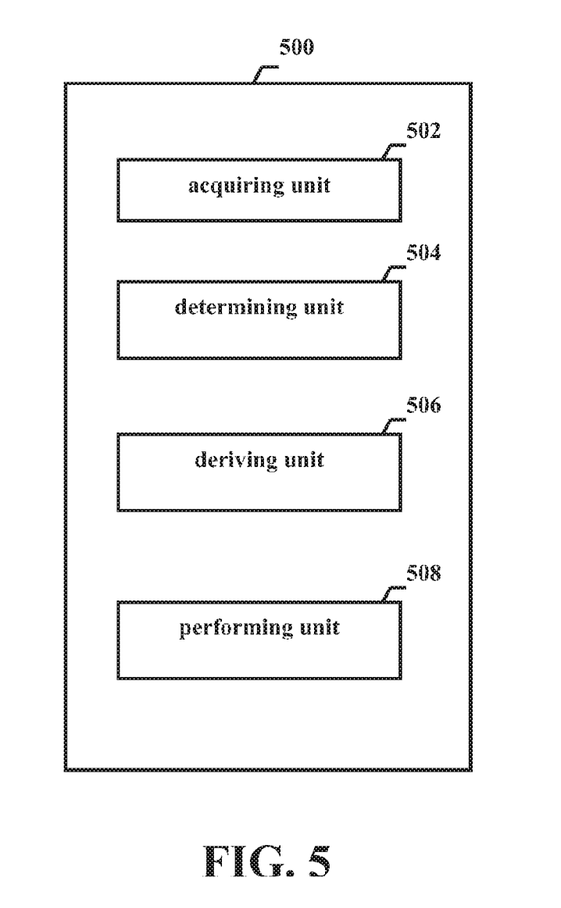
FIG. 5 is a block diagram illustrating an apparatus for improving air quality in a vehicle in accordance with an exemplary embodiment of the present invention.

FIG. 5 is a block diagram illustrating an apparatus for improving air quality in a vehicle in accordance with an exemplary embodiment of the present invention. The blocks of the apparatus 500 may be implemented by hardware, software, firmware, or any combination thereof to carry out the principles of the present invention. It is understood by those skilled in the art that the blocks described in FIG. 5 may be combined or separated into sub-blocks to implement the principles of the invention as described above. Therefore, the description herein may support any possible combination or separation or further definition of the blocks described herein.

Further, since operations of some components of the apparatus 500 may become apparent with reference to the methods discussed in relation to FIGS. 1-4, the apparatus 500 will be described briefly hereinafter.

Referring to FIG. 5, the apparatus 500 may include an acquiring unit 502, a determining unit 504, a deriving unit 506 and a performing unit 508. The acquiring unit 502 may be configured to acquire state information about the vehicle and/or environmental information of the vehicle. The determining unit 504 may be configured to determine whether ventilation of the vehicle is to be performed according to the state information and/or the environmental information. The deriving unit 506 may be configured to derive a time period for ventilation of the vehicle according to the state information and/or the environmental information if it is determined that the ventilation of the vehicle is to be performed. The performing unit 508 may be configured to perform the ventilation of the vehicle in open mode automatically for the derived time period so as to improve the air quality in the vehicle.

According to an embodiment of the present invention, the state information about the vehicle may be an age of the vehicle. In this case, the determining unit 504 may be further configured to determine that ventilation of the vehicle is to be performed if the age of the vehicle is within a predetermined range of ages, and the deriving unit 506 may be further configured that: when the age of vehicle is within the predetermined range of ages, the smaller the age of the vehicle is, the longer the time period for ventilation of the vehicle is.

According to another embodiment of the present invention, the state information about the vehicle may be an unused time that the vehicle is not used. In this case, the determining unit 504 may be further configured to determine that ventilation of the vehicle is to be performed if the unused time of the vehicle exceeds a predetermined interval, and the deriving unit 506 may be further configured that: when the unused time of the vehicle exceeds the predetermined interval, the longer the unused time of the vehicle is, the longer the time period for ventilation of the vehicle is.

According to yet another embodiment of the present invention, the environmental information may be prediction information regarding usage of the vehicle. In this case, the determining unit 504 may be further configured to determine, with the prediction information, the time point at which the vehicle will be used; and determine that ventilation of the vehicle is to be performed a predetermined time length before the time point at which the vehicle will be used.

According to still another embodiment of the present invention, the environmental information may be temperature and/or humidity of air. In this case, the determining unit 504 may be further configured to determine that ventilation of the vehicle is to be performed if the temperature and/or the humidity is higher than a predetermined value, and the deriving unit 506 may be further configured that: when the temperature and/or humidity is higher than the predetermined value, the longer the vehicle is exposed outdoor, the longer the time period for ventilation of the vehicle is.

Those skilled in the art may clearly understand from the above embodiments that the present invention may be implemented by software with necessary hardware, or by hardware, firmware and the like. Based on such understanding, the embodiments of the present invention may be embodied in part in a software form. The computer software may be stored in a readable storage medium such as a floppy disk, a hard disk, an optical disk or a flash memory of the computer. The computer software comprises a series of instructions to make the computer (e.g., a personal computer, a service station or a network terminal) execute the method or a part thereof according to respective embodiments of the present invention.

Figure 6:
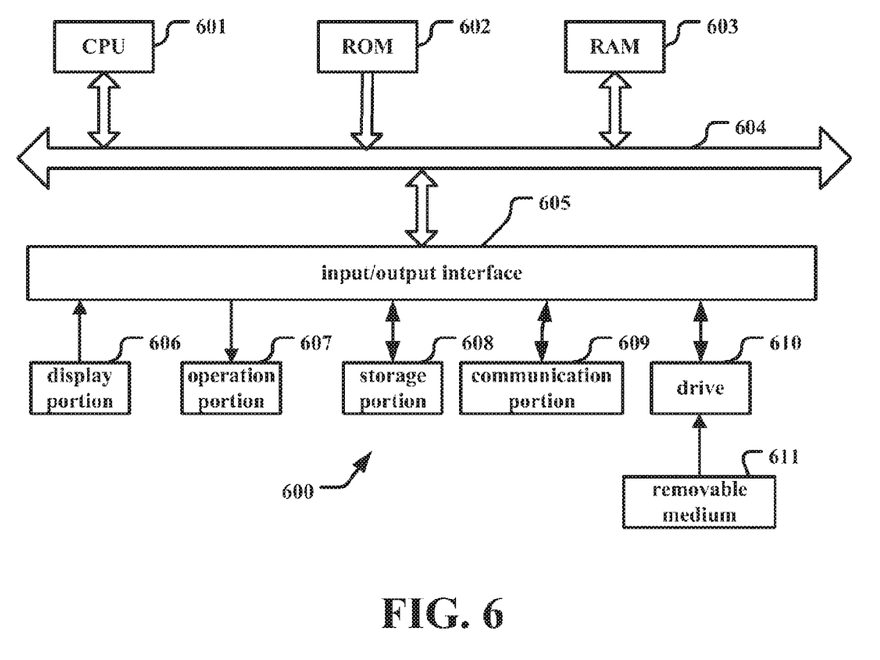
FIG. 6 is a block diagram illustrating a hardware configuration of a computer which can perform the method for improving air quality in a vehicle in accordance with the present invention.

FIG. 6 is a block diagram illustrating a hardware configuration of a computer which can perform the method for improving air quality in a vehicle in accordance with the present invention. As illustrated in FIG. 6, the computer 600 includes a central processing unit (CPU) 601, a read only memory (ROM) 602, a random access memory (RAM) 603, an input/output interface 605, and a bus 604 that connects them to one another.

A display portion 606, an operation portion 607, a storage portion 608, a communication portion 609, a drive portion 610, and the like are connected to the input/output interface 605.

The display portion 606 is a display device that uses, for example, liquid crystal, electro-luminescence (EL), or a cathode ray tube (CRT). The operation portion 607 is a controller, a pointing device, a keyboard or the like. The storage portion 608 is a non-volatile storage device. The storage portion 608 is, for example, a hard disk drive (HDD), a flash memory, or another solid-state memory. The drive portion 610 is, for example, a device capable of driving a removable medium 611 such as an optical recording medium, a floppy (registered trademark) disk, a magnetic recording tape, and a flash memory. In contrast, the storage portion 608 is often used as a device installed into the computer 600 in advance, which mainly drives a non-removable medium. The communication portion 609 is a modem, a router, or another communication apparatus for communicating with another device, the modem, the router, or the other communication apparatus being connectable to a LAN, a wide area network (WAN), or the like. The communication portion 609 may perform a wired or wireless communication.

Information processing by the computer 600 having the hardware configuration as described above is realized by cooperation of software stored in the storage portion 608, the ROM 602, or the like and a hardware resource of the computer 600. Specifically, the method is realized by the CPU 601 loading a program configuring software that is stored in the storage portion 608, the ROM 602, or the like into the RAM 603 and executing the loaded program.

The programs are installed into the computer 600 via, for example, the removable medium 611. Alternatively, the programs may be installed into the computer 600 via a global network or the like. Further, the programs to be executed by the computer 600 may be programs chronologically performed or programs processed in parallel or at a necessary timing, for example, when calling is performed.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for improving air quality in a vehicle, the method comprising the acts of:
    acquiring at least one of state information about the vehicle and environmental information of the vehicle;
    determining whether ventilation of the vehicle is to be performed according to the acquired information;
    deriving a time period for ventilation of the vehicle according to the acquired information if it is determined that the ventilation of the vehicle is to be performed; and
    performing the ventilation of the vehicle in open mode automatically for the derived time period so as to improve the air quality in the vehicle,
    wherein the acquired information includes an age of the vehicle.

2. The method according to claim 1, wherein the act of determining comprises:
    determining that the ventilation of the vehicle is to be performed if the age of the vehicle is within a predetermined range of ages.

3. The method according to claim 2, wherein the act of deriving comprises:
    when the age of vehicle is within the predetermined range of ages, the smaller the age of the vehicle is, the longer the time period for ventilation of the vehicle is.

4. A method for improving air quality in a vehicle, the method comprising the acts of:
    acquiring at least one of state information about the vehicle and environmental information of the vehicle;
    determining whether ventilation of the vehicle is to be performed according to the acquired information;
    deriving a time period for ventilation of the vehicle according to the acquired information if it is determined that the ventilation of the vehicle is to be performed; and
    performing the ventilation of the vehicle in open mode automatically for the derived time period so as to improve the air quality in the vehicle,
    wherein the acquired information about the vehicle includes an unused time that the vehicle is not used.

5. The method according to claim 4, wherein the act of determining comprises:
    determining that the ventilation of the vehicle is to be performed if the unused time of the vehicle exceeds a predetermined interval.

6. The method according to claim 5, wherein the act of deriving comprises:
    when the unused time of the vehicle exceeds the predetermined interval, the longer the unused time of the vehicle is, the longer the time period for ventilation of the vehicle is.

7. A method for improving air quality in a vehicle, the method comprising the acts of:
    acquiring at least one of state information about the vehicle and environmental information of the vehicle;
    determining whether ventilation of the vehicle is to be performed according to the acquired information;
    deriving a time period for ventilation of the vehicle according to the acquired information if it is determined that the ventilation of the vehicle is to be performed; and
    performing the ventilation of the vehicle in open mode automatically for the derived time period so as to improve the air quality in the vehicle, wherein the acquired information includes prediction information regarding usage of the vehicle obtained from a source remote from the vehicle and from a key fob carried by a driver.

8. The method according to claim 7, wherein the act of determining comprising:
   determining, with the prediction information, the time point at which the vehicle will be used; and
   determining that the ventilation of the vehicle is to be performed a predetermined time length before the time point at which the vehicle will be used.

9. A method for improving air quality in a vehicle, the method comprising the acts of:
   acquiring at least one of state information about the vehicle and environmental information of the vehicle;
   determining whether ventilation of the vehicle is to be performed according to the acquired information;
   deriving a time period for ventilation of the vehicle according to the acquired information if it is determined that the ventilation of the vehicle is to be performed; and
   performing the ventilation of the vehicle in open mode automatically for the derived time period so as to improve the air quality in the vehicle,
   wherein
      the acquired information includes temperature and/or humidity of air and a length of outdoor exposure time of the vehicle,
      the act of determining includes determining that the ventilation of the vehicle is to be performed if the temperature and/or the humidity is higher than a predetermined value, and
      when the temperature and/or the humidity is higher than the predetermined value, the act of performing includes basing the time period for ventilation of the vehicle on the determined length of outdoor exposure time of the vehicle.

10. An apparatus of improving air quality in a vehicle, comprising:
    a computer and associated memory in which program code is stored, which when executed, causes the computer to:
    acquire at least one of state information about the vehicle and environmental information of the vehicle;
    determine whether ventilation of the vehicle is to be performed according to the acquired information;
    derive a time period for ventilation of the vehicle according to the acquired information if it is determined that the ventilation of the vehicle is to be performed; and
    perform the ventilation of the vehicle in open mode automatically for the derived time period so as to improve the air quality in the vehicle,
    wherein the acquired information includes an age of the vehicle.

11. The apparatus according to claim 10, wherein the program code is configured such that the computer further executes program code to:
    when determining whether ventilation of the vehicle is to be performed, determining the ventilation of the vehicle is to be performed if the age of the vehicle is within a predetermined range of ages.

12. The apparatus according to claim 11, wherein the program code is configured such that computer further executes program code such that:
    when the age of vehicle is within the predetermined range of ages, the smaller the age of the vehicle is, the longer the time period for ventilation of the vehicle is.

13. The apparatus according to claim 10, wherein the acquired information about the vehicle includes an unused time that the vehicle is not used, and further wherein the computer further executes program code such that:
    when the unused time of the vehicle exceeds a predetermined interval, determining the ventilation of the vehicle is to be performed.

14. The apparatus according to claim 13, wherein the program code is configured such that the computer further executes program code such that:
    when the unused time of the vehicle exceeds the predetermined interval, the longer the unused time of the vehicle is, the longer the time period for ventilation of the vehicle is.

15. The apparatus according to claim 10, wherein the acquired information is prediction information regarding usage of the vehicle, and further wherein the program code is configured such that the computer further executes program code to:
    determine, with the prediction information, the time point at which the vehicle will be used; and
    perform the ventilation of the vehicle for a predetermined time length before the time point at which the vehicle will be used.

16. The apparatus according to claim 10, wherein the state information includes temperature and/or humidity of air and a length of outdoor exposure time of the vehicle, and further wherein the program code is configured such that the computer further executes program code to:
    determine the ventilation of the vehicle is to be performed if the temperature and/or the humidity is higher than a predetermined value, and
    when the temperature and/or the humidity is higher than the predetermined value, perform the ventilation of the vehicle based on the time period for ventilation of the vehicle on the determined length of outdoor exposure time of the vehicle, such that the longer the vehicle is exposed outdoor, the longer the time period for ventilation of the vehicle is.

17. A non-transient computer readable medium comprising executable instructions for carrying out a method for improving air quality in a vehicle, the method including the acts of:
    acquiring at least one of state information about the vehicle and environmental information of the vehicle;
    determining whether ventilation of the vehicle is to be performed according to the acquired information;
    deriving a time period for ventilation of the vehicle according to the acquired information if it is determined that the ventilation of the vehicle is to be performed; and
    performing the ventilation of the vehicle in open mode automatically for the derived time period so as to improve the air quality in the vehicle,
    wherein the acquired information includes at least one of an age of the vehicle, an unused time that the vehicle is not used, prediction information regarding usage of the vehicle obtained from a source remote from the vehicle and a key fob carried by a driver, and a length of outdoor exposure time of the vehicle.

* * * * *